(12) United States Patent
Jeng et al.

(10) Patent No.: US 7,850,359 B2
(45) Date of Patent: Dec. 14, 2010

(54) OPTICAL FILM OF A DISPLAY, METHOD FOR PRODUCING THE SAME AND SAID DISPLAY

(75) Inventors: Yue-Shih Jeng, Hsinchu (TW); Pi-Chun Yeh, Hsinchu (TW); Chih-Jen Hu, Hsinchu (TW); Feng-Yuan Gan, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 474 days.

(21) Appl. No.: 12/105,705

(22) Filed: Apr. 18, 2008

(65) Prior Publication Data

US 2009/0168397 A1 Jul. 2, 2009

(30) Foreign Application Priority Data

Dec. 28, 2007 (TW) .............................. 96150766 A

(51) Int. Cl.
*F21V 33/00* (2006.01)
(52) U.S. Cl. ..................... 362/627; 362/84; 362/629; 362/311.01
(58) Field of Classification Search ............ 362/84, 362/97.1, 97.4, 311.01, 311.03–311.05, 627, 362/629
See application file for complete search history.

(56) References Cited

U.S. PATENT DOCUMENTS

| | | | |
|---|---|---|---|
| 5,506,704 A | 4/1996 | Broer et al. | |
| 6,517,213 B1 * | 2/2003 | Fujita et al. | .................... 362/84 |
| 2002/0105608 A1 | 8/2002 | Lazarev | |
| 2006/0028600 A1 | 2/2006 | Wu et al. | |
| 2006/0103781 A1 | 5/2006 | Jeng et al. | |
| 2006/0176422 A1* | 8/2006 | Jeng et al. | ..................... 349/96 |
| 2007/0024776 A1 | 2/2007 | Jeng et al. | |
| 2008/0231270 A1 | 9/2008 | Fontius et al. | |

FOREIGN PATENT DOCUMENTS

| | | |
|---|---|---|
| JP | 10-282494 | 10/1998 |
| TW | I237133 | 8/2005 |
| WO | WO 2005/071039 | 8/2005 |

OTHER PUBLICATIONS

English language translation of abstract of TW I237133.
Chinese language office action dated Jul. 24, 2009.
English language translation of abstract and pertinent parts of JP 10-282494.

\* cited by examiner

*Primary Examiner*—Laura Tso
(74) *Attorney, Agent, or Firm*—Thomas, Kayden, Horstemeyer & Risley, LLP

(57) ABSTRACT

An optical film of a display and a method for producing the same are provided. The display includes a light source and an optical film. The light source provides the first light. The optical film includes at least one coating layer. The coating layer has a first surface and a second surface opposite to the first surface. The coating layer is adapted to absorb the first light from the first surface to excite a second light to emit through the second surface. The intensity of the second light is larger than that of the first light.

26 Claims, 5 Drawing Sheets

OPTICAL FILM OF A DISPLAY, METHOD FOR PRODUCING THE SAME AND SAID DISPLAY

This application claims the benefit from the priority of Taiwan Patent Application No. 096150766 filed on Dec. 28, 2007, the disclosures of which are incorporated by reference herein in their entirety.

CROSS-REFERENCES TO RELATED APPLICATIONS

Not applicable.

BACKGROUND OF THE INVENTION

1. Field of the Invention

The present invention provides a display and a method for producing the same. In particular, the present invention provides an optical film for use in a display and a method for producing the same.

2. Descriptions of the Related Art

Current liquid crystal displays (LCDs) generally have brightness enhancement films (BEFs), which improve the brightness and light emitting efficiency of the LCDs. Conventional BEFs rely on backlight modules as the light source, and works under the following principle: an additional reflective optical film is added to the conventional backlight module, so that a portion of the light emitted from the backlight module may be recycled by being reflected twice, thus utilizing the light from the backlight module more efficiently. BEFs commonly include prism type BEFs, reflective type polarizing BEFs, and cholesteric liquid crystal reflective BEFs. For example, in a prism type BEF, diffused light is transmitted through the BEF within a range of 70° from the normal by means of refraction and total internal reflection, while the portion of light outside of this range is reflected and retransmitted through the BEF for use. In this way, the brightness of a display may be improved by about 40% to 70%.

In more detail, FIG. 1 illustrates the schematic structure of a conventional display incorporating a reflective type polarizing BEF. The display depicted in FIG. 1 comprises an upper polarizer 101, a lower polarizer 102, a liquid crystal unit 103, a backlight module 104 and a reflective type polarizing BEF 105. The left view of FIG. 1 illustrates a display without the use of a reflective type polarizing BEF, in which case only about 50% of polarized light 106 emitted from the backlight module 104 will be transmitted through the lower polarizer 102 to be used by the liquid crystal unit 103. In comparison, when the reflective type polarizing BEF 105 is incorporated in a display, 50% of the light (indicated as the first polarized light 107) is allowed to be transmitted through the reflective type polarizing BEF 105, while the other 50% of the light (indicated as the second polarized light 108) is reflected. The reflected second polarized light 108 is then reflected a second time for transformation into a polarized light parallel with the first polarized light 107. At this time, the light is transmitted through the lower polarizer 102 and into the liquid crystal unit 103. With the repeated reflection, the brightness of the display is enhanced.

Although the reflective type polarizing BEF technology described above may enhance the brightness of a display, there is a complex structure and manufacturing process. For example, such a film can only be interposed between the backlight module and polarizer. To mitigate optical interference, a diffusing layer has to be used in combination. Furthermore, there is a thickness of more than hundreds of micrometers, which prevents the apparatus from becoming more lightweight and miniaturized. In view of this, it is highly desirable in the art to improve the BEF technologies for use in display panels to simplify the manufacturing process and improve light emitting efficiency.

SUMMARY OF THE INVENTION

One objective of this invention is to provide an optical film structure for use in a display and a method for producing the same. The optical film may help to enhance the intensity of light from a backlight module, thus improving the overall light intensity.

An optical film for use in a display is disclosed in this invention. The display comprises a light source and an optical film. The light source is adapted to provide a first light. The optical film includes at least one coating layer which has a first surface and a second surface opposite to the first surface. The at least one coating layer is capable of absorbing the first light through the first surface to excite a second light to be emitted through the second surface. The second light has an intensity higher than that of the first light.

Another objective of this invention is to provide a display with an optical film. The display is capable of improving the overall light intensity as compared to the technologies of the prior art. Moreover, several options are provided in the manufacturing process, so that the optical film may be disposed either inside or outside the liquid crystal panel.

To this end, a display is disclosed in this invention. The display comprises a light source and an optical film. The light source is adapted to provide a first light. The optical film includes at least one coating layer which has a first surface and a second surface opposite to the first surface. The at least one coating layer is capable of absorbing the first light through the first surface to excite a second light to be emitted through the second surface. The second light has intensity higher than that of the first light.

Yet a further objective of this invention is to provide a method for producing an optical film for use in a display. This method is capable of forming an optical film of merely several micrometers thick in a display by using a conventional film-coating process. As a result, the process for manufacturing BEFs is simplified as compared to the processes of the prior art.

To this end, a method for producing an optical film for use in a display is disclosed in this invention. The method comprises the following steps: (1) providing at least one coating layer on the display, wherein the at least one coating layer includes a luminescent dye capable of absorbing the first light through a first surface thereof to excite a second light to be emitted through the second surface thereof, wherein the second light has an intensity higher than that of the first light; and (2) curing the at least one coating layer.

In conclusion, this invention may improve the shortcoming of an excessively thick BEF in the display panels of the prior art, simplify the complex conventional manufacturing process, enhance the luminescent intensity of the backlight module and increase light utilization of the display.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

This invention will now be explained with reference to several embodiments thereof. However, these embodiments are not intended to limit this invention to any specific context, applications or particular methods described in these embodiments. Therefore, the description of these embodiments is only intended to illustrate rather than to limit this invention. It should be noted that in the following embodiments and attached drawings, the elements not directly related to this invention are omitted from depiction.

Figure 1:
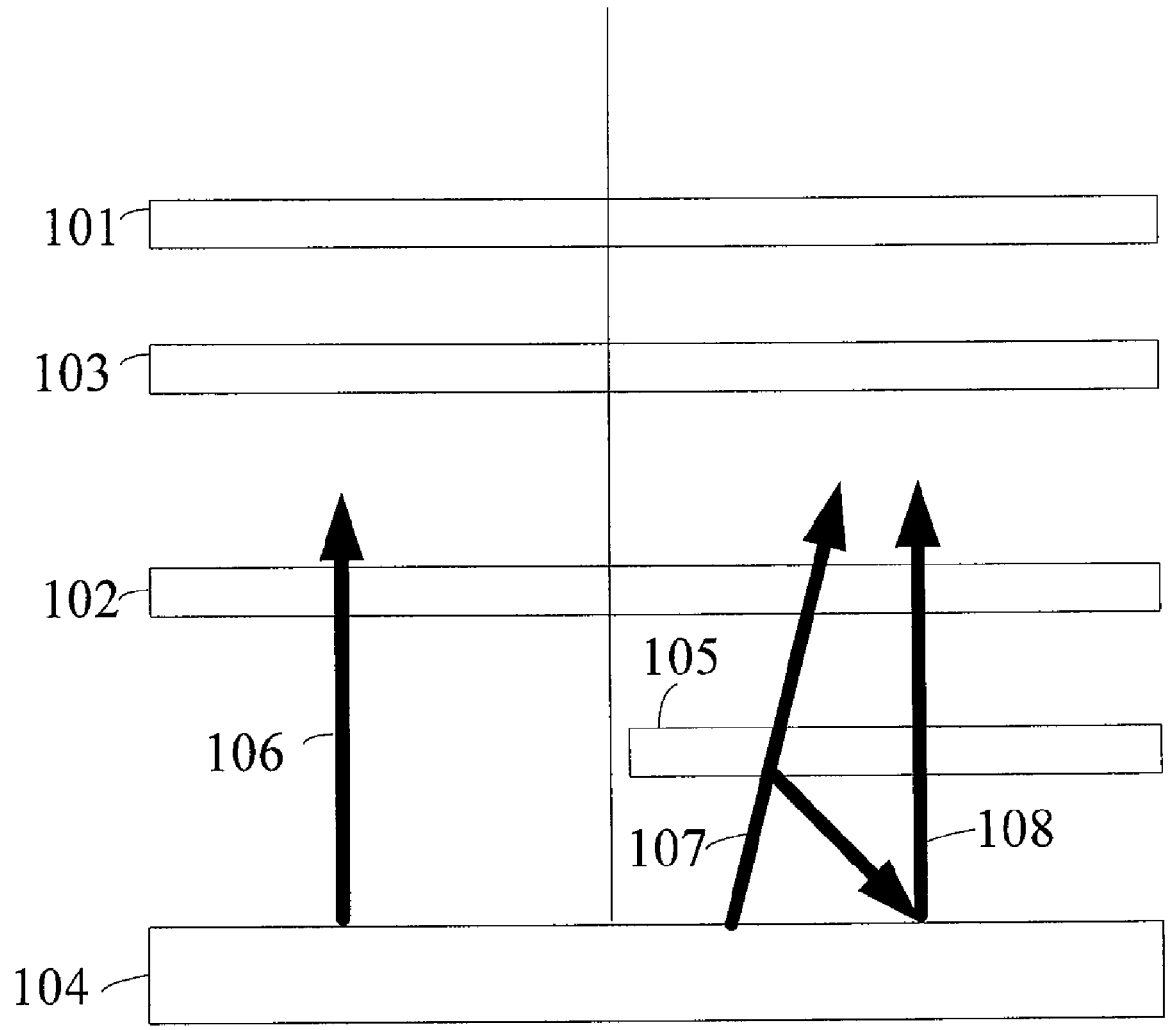
FIG. 1 depicts a schematic structure using the BEF of the prior art to enhance the brightness.
Figure 2A:
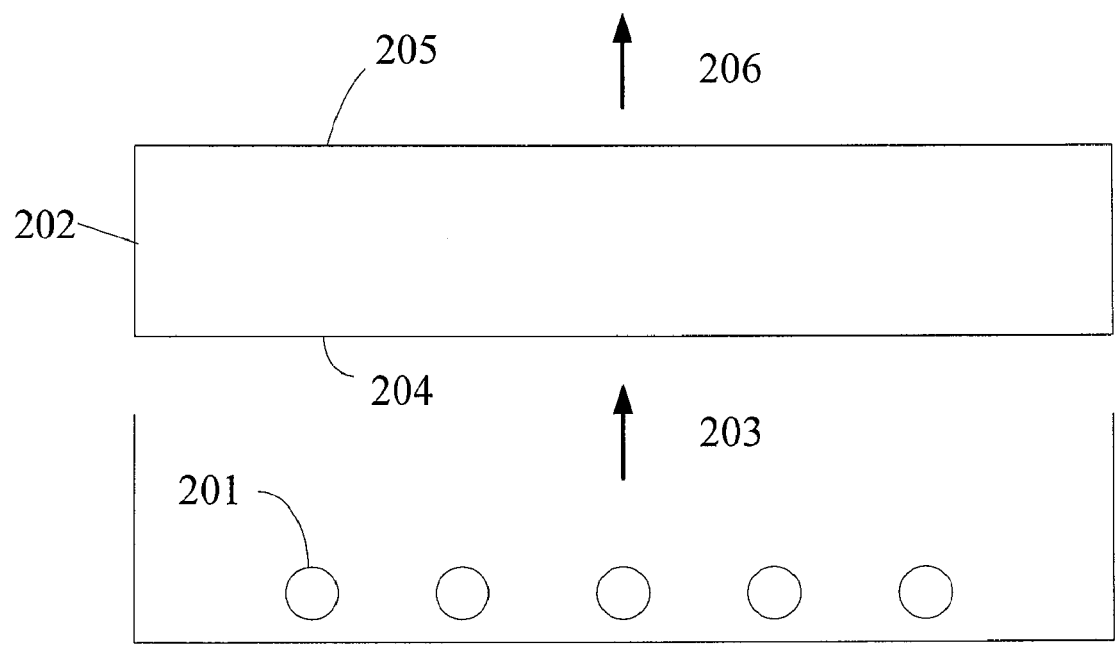
FIG. 2A is a schematic view of a structure in accordance with an embodiment of this invention.

FIG. 2A depicts the first embodiment of this invention, which is an optical film 202 and a backlight module for use in a display. The display comprises a light source 201 and an optical film 202 in the backlight module. The light source 201 is adapted to provide a first light 203 for the optical film 202. The light source of the backlight module may be a direct lighting type as shown in FIG. 2A, or be an edge lighting type light source with a light guide plate. The optical film 202 comprises at least one coating layer with a first surface 204 and a second surface 205 opposite to the first surface. This invention is unique in that the coating layer of the optical film 202 is adapted to absorb the first light 203 through the first surface 204 to excite a second light 206 to be emitted through the second surface 205. Particularly, the second light 206 has intensity higher than that of the first light 203 to help enhance the luminescent brightness of the backlight module.

It should be noted that the coating layer of the optical film 202 includes a luminescent dye. In particular, the luminescent dye may either be an organic luminescent dye or an inorganic luminescent dye. In the preferred embodiment, an organic luminescent dye dissolved in a liquid crystal, e.g., an organic luminescent dye dissolved in a twist nematic (TN) crystal, may be used as the primary coating layer material of the optical film 202 to provide a polarized light. The organic luminescent dye may be, for example but not limited to, a polynuclear aromatic hydrocarbon (PAH) derivative. In this embodiment, the coating layer with a liquid crystal material added therein forms a liquid crystal layer. Consequently, when passing through the liquid crystal layer of the optical film 202, the first light from the light source 201 will excite a polarized second light 206. In this way, the polarizer in the solutions of the prior art may be eliminated.

Furthermore, the optical film formed in this invention is only 0.4 micrometers to several tens of micrometers in thickness, preferably 0.4 micrometers to 800 micrometers. Particularly, for the backlight module, the optical film may be directly formed or coated thereon. Compared to the BEFs of the prior art with a thickness of more than hundreds of micrometers, the optical film of this invention may effectively decrease the thickness, which complies with increasing trend of lightweight and miniaturized flat panel displays.

Figure 2B:
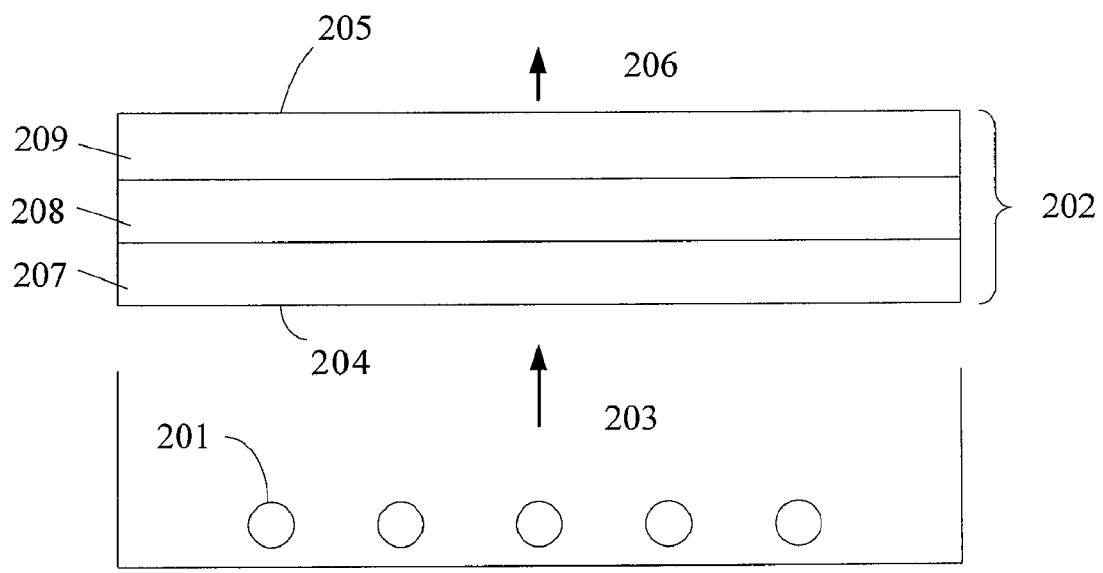
FIG. 2B is a schematic view of a structure in accordance with another embodiment of this invention.

In application, the coating layer of the optical film 202 may include a plurality of colored layers stacked on each other to match the light of different colors provided by the backlight module. In more detail, as shown in FIG. 2B, the light source 201 of the backlight module provides a white light, wherein the coating layer of the optical film 202 may include three colored layers, i.e., a red coating layer 207, a green coating layer 208 and a blue coating layer 209 respectively. Each of the colored layers is adapted to receive the first light 203 to excite a red polarized light, a green polarized light and a blue polarized light respectively. The second light 206 is a white polarized light composed of the excited red light, green light and blue light. In other examples (not shown), if the backlight module provides only a red light, the coating layer of the optical film may only include a green and a blue coating layer correspondingly. Unlike the optical films of the prior art which can only use the white light as a light source, the optical film 202 of this invention may be formed by adjusting or changing the number, color, thickness, arrangement and combinations of the plurality of colored coating layers according to the different light sources provided by the backlight module. As a consequence, a wider application scope of this invention is achieved.

Figure 3:
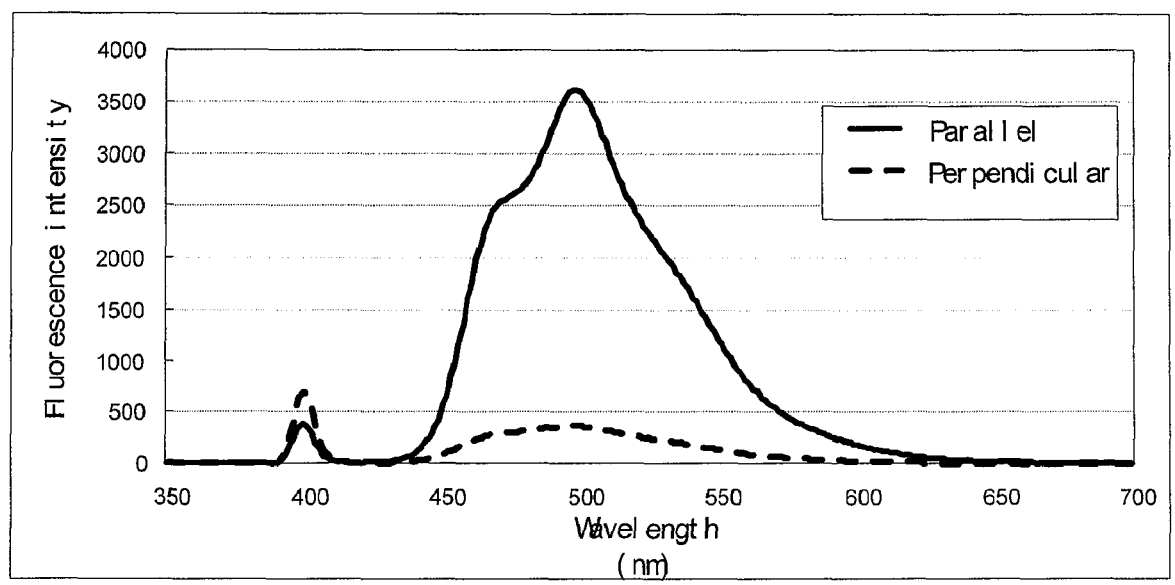
FIG. 3 is a schematic graph illustrating the test results in an embodiment of this invention.

FIG. 3 illustrates the results of an actual test on an embodiment of this invention, where the horizontal axis represents a wavelength while the vertical axis represents a fluorescent intensity. As the test results reveal, when absorbing the first light with a wavelength of about 400 nm, the optical film in the above embodiment excites a second light with a wavelength ranging from about 400 nm to 700 nm, for example, substantially about 500 nm. Particularly, the second light exhibits a much larger transmissivity in the parallel polarizing direction (as shown by the solid line) than in a direction perpendicular to the polarizing direction (as shown by the dashed line). The test results demonstrate the polarizing characteristics of the excited second light. Additionally, by comparing the above embodiment against another comparison example where the optical film is replaced by a bare glass in a test (not shown), it is found that the optical film of the embodiment of this invention has a gain of at least 6% in brightness.

Figure 4:
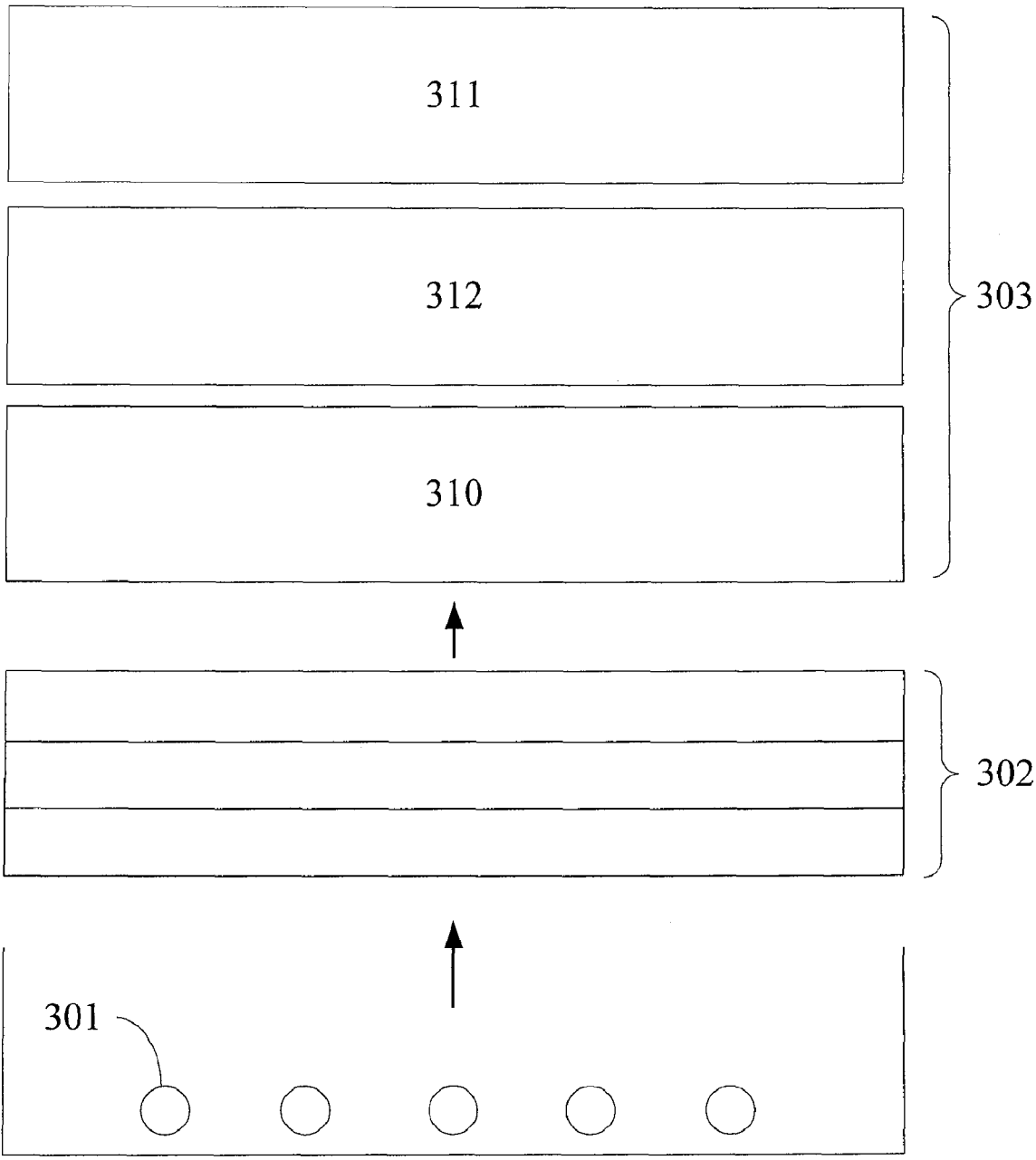
FIG. 4 is a schematic view of a structure in accordance with another embodiment of this invention.

FIG. 4 depicts another embodiment of this invention, which is a display 300 incorporating the aforesaid optical film. In more detail, the display 300 comprises a light source 301, an optical film 302, and a liquid crystal panel 303. The light source 301 and the optical film 302 have the same functions as those described in the above embodiment, and thus will not be further described again. On the other hand, the liquid crystal panel 303 in the display of this embodiment has a thin film transistor (TFT) array substrate 310, a color filter substrate 311 and a liquid crystal layer 312 which together form a sandwich structure, i.e., the liquid crystal layer 312 is interposed between the TFT array substrate 310 and the color filter substrate 311.

This invention is unique in that the optical film 302 may be disposed either on the inside or outside the liquid crystal panel 303. More specifically, the optical film 302 may be formed on either the TFT array substrate 310 or the color filter substrate 311. In other words, the optical film 302 may be formed optionally on either side of the TFT array substrate 310 or either side of the color filter substrate 311. This nature of the optical film 302 renders the manufacturing process of the display 300 more flexible and simple. In comparison, conventional BEFs can only be interposed between a diffusing film and a polarizer, so the structure and manufacturing process thereof lack the flexibility or the possibility to be integrated.

However, the optical film 302 may be formed inside the liquid crystal panel 303. In other words, the optical film 302 is located between the liquid crystal layer 312 and the color filter substrate 311, or located between the liquid crystal layer 312 and the TFT array substrate 310. The thickness of the optical film 302 is, for example, about 0.4 micrometers to about 20 micrometers, and more preferably, about 0.4 micrometers to about 10 micrometers.

Figure 5:
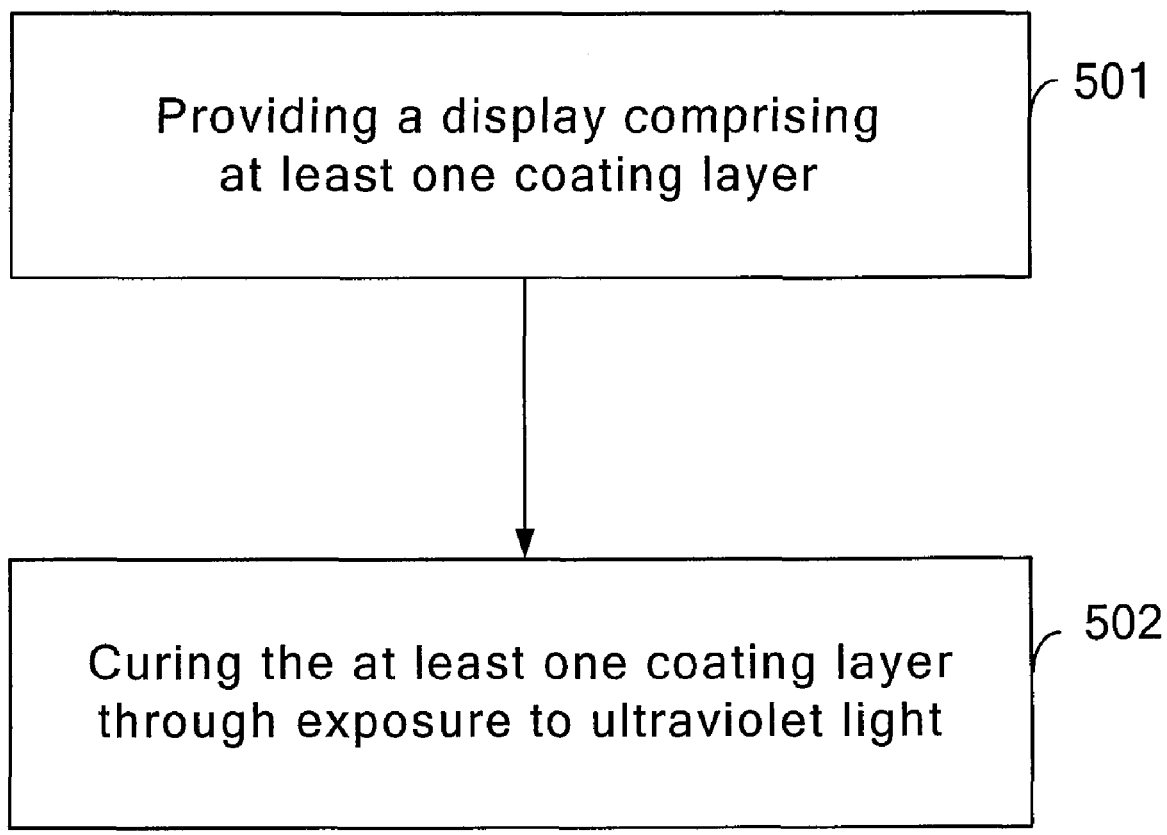
FIG. 5 is a flow diagram of a manufacturing method in accordance with an embodiment of this invention.

FIG. 5 depicts a method for producing an optical film for use in the display described above. Initially, in Step 501, a display comprising at least one coating layer is provided. The approach to form a coating layer on the display is to provide at least one coating layer on the display through a coating process. Specifically, in the coating process, a luminescent dye is dissolved in a liquid crystal and then coated onto any of the substrates in the aforesaid liquid crystal panel through a spin coating or a slot die coating process. Such coating processes are well known to those skilled in the art, and thus will not be further described. Furthermore, it should be noted that, in the coating step, the coating process may be repeated to form a plurality of colored layers desired to be included in the practical coating layer. For example, three different coating layers may be coated to form a red coating layer, a green coating layer and a blue coating layer stacked on each other.

Finally, a curing process is executed in Step 502 to cure the coating layer. In more detail, this step is accomplished by exposing at least one coating layer to ultraviolet light to evaporate the solvent contained in the coating layer, for example, to evaporate an organic solvent or the like by heating.

In conclusion, this invention replaces the conventional BEF with an optical film capable of emitting light when being excited. The display incorporating an optical film of this invention may not only have an improved light utilization factor, but also have a different structure from a conventional display because of the different principle used to enhance the brightness. The optical film formed directly on the backlight module of this invention is only 0.4 micrometers to 800 micrometers in thickness. The optical film formed directly inside the liquid crystal panel of this invention is only about 0.4 micrometers to about 20 micrometers, and more preferably, about 0.4 micrometers to about 10 micrometers. Compared to the BEFs with a thickness of more than hundreds of micrometers in the display of the prior art, the optical film of this invention may effectively decrease the thickness, which complies with the trend towards a light weight and miniaturized flat panel displays.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An optical film for use in a display, the display comprising a light source providing a first light, the optical film including at least one coating layer which has a first surface and a second surface opposite to the first surface, the at least one coating layer being capable of absorbing the first light through the first surface to excite a second light to be emitted through the second surface, wherein the second light has an intensity larger than that of the first light.

2. The optical film as claimed in claim 1, wherein the at least one coating layer includes a luminescent dye.

3. The optical film as claimed in claim 2, wherein the luminescent dye is an organic luminescent dye.

4. The optical film as claimed in claim 3, wherein the organic luminescent dye is a polynuclear aromatic hydrocarbon (PAH) derivative.

5. The optical film as claimed in claim 2, wherein the at least one coating layer further includes a liquid crystal layer being adapted to transfer the second light into a polarized light.

6. The optical film as claimed in claim 5, wherein the at least one coating layer includes three colored layers, which are adapted to excite a red light, a green light and a blue light, respectively.

7. The optical film as claimed in claim 5, wherein the at least one coating layer includes a plurality of colored layers being stacked up with each other.

8. The optical film as claimed in claim 5, wherein the liquid crystal layer includes twist nematic crystal.

9. The optical film as claimed in claim 1, wherein the second light is a white light.

10. The optical film as claimed in claim 1, wherein the second light has a wavelength ranging from 400 nanometers to 700 nanometers.

11. The optical film as claimed in claim 1, wherein the first light has a wavelength of about 400 nanometers.

12. A display comprising:
a light source providing a first light; and
an optical film including at least one coating layer which has a first surface and a second surface opposite to the first surface, the at least one coating layer being capable of absorbing the first light through the first surface to excite a second light to be emitted through the second surface, wherein the second light has an intensity larger than that of the first light.

13. The display as claimed in claim 12, wherein the at least one coating layer includes a luminescent dye.

14. The display as claimed in claim 13, wherein the luminescent dye is an organic luminescent dye.

15. The display as claimed in claim 14, wherein the organic luminescent dye is a polynuclear aromatic hydrocarbon (PAH) derivative.

16. The display as claimed in claim 13, wherein the at least one coating layer further including a liquid crystal layer being adapted to transfer the second light into a polarized light.

17. The display as claimed in claim 16, wherein the at least one coating layer includes three colored layers, which are adapted to excite a red light, a green light and a blue light, respectively.

18. The display as claimed in claim 16, wherein the at least one coating layer includes a plurality of colored layers being stacked up with each other.

19. The display as claimed in claim 12, wherein the second light is a white light.

20. The display as claimed in claim 12, wherein the second light has a wavelength ranging from 400 nanometers to 700 nanometers.

21. The display as claimed in claim 12, further including a liquid crystal panel having a thin film transistor array substrate, a color filter substrate and a liquid crystal layer disposed between the thin film transistor array substrate and the color filter substrate, wherein the optical film is disposed on one of the thin film transistor array substrate and the color filter substrate.

22. The display as claimed in claim 12, wherein the optical film has a thickness ranging from 0.4 micrometers to 800 micrometers.

23. A method for producing an optical film for use in a display, the method comprising:

providing at least one coating layer on the display, the at least one coating layer including a luminescent dye being capable of absorbing a first light through a first surface thereof to excite a second light to be emitted through a second surface thereof, wherein the second light has an intensity larger than that of the first light; and curing the at least one coating layer.

24. The method as claimed in claim 23, wherein the step of providing the at least one coating layer further comprises:

dissolving the luminescent dye in a liquid crystal for being adapted to transfer the second light into a polarized light.

25. The method as claimed in claim 23, wherein the step of providing the at least one coating layer on the display comprises performing spin coating or slot die coating.

26. The method as claimed in claim 23, wherein the step of curing the at least one coating layer comprises exposing the at least one coating layer under ultraviolet light.

* * * * *